United States Patent
Brookbank

Patent Number: 6,099,271
Date of Patent: Aug. 8, 2000

[54] DOWNHOLE ELECTRICAL SUBMERSIBLE PUMP WITH DYNAMICALLY STABLE BEARING SYSTEM

[75] Inventor: Earl B. Brookbank, Claremore, Okla.

[73] Assignee: Baker Hughes Incorporated, Houston, Tex.

[21] Appl. No.: 09/285,634

[22] Filed: Apr. 2, 1999

[51] Int. Cl.⁷ .............................. F04B 17/03; F16C 17/03
[52] U.S. Cl. ................................ 417/423.12; 417/424.2; 384/309; 384/312
[58] Field of Search ............................. 417/423.2, 424.1, 417/424.2, 423.3; 384/312, 309

[56] References Cited

U.S. PATENT DOCUMENTS

| | | | |
|---|---|---|---|
| 3,242,360 | 3/1966 | Carle | 310/87 |
| 3,711,169 | 1/1973 | Gardner | 308/73 |
| 3,936,103 | 2/1976 | Byrns et al. | 308/73 |
| 4,201,524 | 5/1980 | Wilkins | 417/364 |
| 4,513,215 | 4/1985 | Del Serra | 310/90 |
| 4,686,403 | 8/1987 | Hackstie et al. | 310/90 |
| 4,714,357 | 12/1987 | Groth et al. | 384/312 |
| 4,886,430 | 12/1989 | Veronesi et al. | 417/423.13 |
| 5,013,947 | 5/1991 | Ide | 310/67 R |
| 5,288,153 | 2/1994 | Gardner | 384/311 |
| 5,480,233 | 1/1996 | Cunningham | 384/308 |
| 5,613,781 | 3/1997 | Kuzdzal et al. | 384/99 |
| 5,634,725 | 6/1997 | Chester | 384/117 |
| 5,659,214 | 8/1997 | Guardiani et al. | 310/87 |
| 5,674,057 | 10/1997 | Guardiani et al. | 417/423.3 |
| 5,720,558 | 2/1998 | Edney et al. | 384/309 |
| 5,743,657 | 4/1998 | O'Reilly et al. | 384/312 |
| 5,828,149 | 10/1998 | Parmeter et al. | 310/87 |

OTHER PUBLICATIONS

Application Of High Speed And High Performance Fluid Film Bearings, Etc./1994/Zeidan & Paquette/Proceedings From 23$^{RD}$ Turbomachinery Symposium.
Rotor–Bearing Stability/Gunter, Jr.
Journal Bearing Design Types and Their Applications To Turbomachinery/Salamone.

Primary Examiner—Charles G. Freay
Assistant Examiner—Robert Z. Evora
Attorney, Agent, or Firm—Felsman, Bradley, Vaden, Gunter & Dillon, L.L.P.; James E. Bradley

[57] ABSTRACT

A bearing configuration for use in electrical submersible pumps having improved stability. The bearing configurations include multi-lobed bearings, such as lemon bore, tri-lobe bearings, pocket bearings and tilting pad type bearings.

12 Claims, 4 Drawing Sheets

6,099,271

DOWNHOLE ELECTRICAL SUBMERSIBLE PUMP WITH DYNAMICALLY STABLE BEARING SYSTEM

TECHNICAL FIELD

This invention relates in general to submersible pump motors and in particular to the incorporation of bearings that provide increased stability. The bearings support the shaft in the motor.

BACKGROUND OF THE INVENTION

A submersible pump is a centrifugal pump having a submersible motor that rotates a shaft to drive a pump. The submersible pump is for producing high volumes of oil and water. A typical submersible pump motor may be from 6–60 feet in length and be rated at several hundred horsepower. Each motor has a stator secured within a tubular housing. A rotor secured to the shaft rotates within a stator.

Because of the long length of the motor, the rotor is made up of a number of rotor sections. Each rotor section comprises a large number of flat disks called laminations that are secured by copper rods. The rotor sections are spaced apart from each other. A bearing assembly is located between each section for maintaining the shaft in axial alignment. The rotor sections are keyed to the shaft for rotation therewith, but are axially movable with respect to the shaft.

Traditionally, the bearing assemblies used in motors, seal sections and pumps of electrical submersible pumps (ESPs) are plain sleeve bearings, which provide radial support. These plain sleeve bearings are not heavily loaded since a large number of bearings are typically used and the ESP units are run in a near vertical orientation. The absence of a substantial load results in an unstable or marginally stable bearing operation that can result in metal-to-metal contact in the bearings, which accelerates bearing failure. Presently, motors using plain sleeve bearings typically have a 50% success rate for passing a vibration test in a test well. Therefore, a need exists for a bearing type that increases the dynamic stability of the bearings.

SUMMARY OF THE INVENTION

An electrical submersible pump assembly for use in a well that has the following elements: 1) an electrical motor having a lubricant-filled housing, a rotor and a stator; 2) a centrifugal pump having a plurality of pump stages within a housing; 3) a seal section connected between the pump and the motor for sealing well fluid from the motor and for reducing a pressure differential between the lubricant in the motor and the fluid in the wellbore; 4) a shaft extending through the motor, seal section and pump for driving the pump; and 5) a plurality of bearings in the motor, seal section and pump for stabilizing the shaft, at least one of the bearings having bearing surfaces having a plurality of lobes, each of the lobes having a radius greater than a radius of the shaft.

In this invention, a more stable bearing configuration is used that replaces plain sleeve bearings in ESP units. The preferred bearing configuration includes multi-lobed bearings, such as lemon bore, tri-lobe bearings, pocket bearings and tilting pad type bearings. It has been found that the use of increased dynamic stability bearings increases the passing rate for vibration tests of submersible pump motors such that vibration test rejections typically occur only from manufacturing defects.

REST MODE FOR CARRYING OUT THE INVENTION

Figure 1:
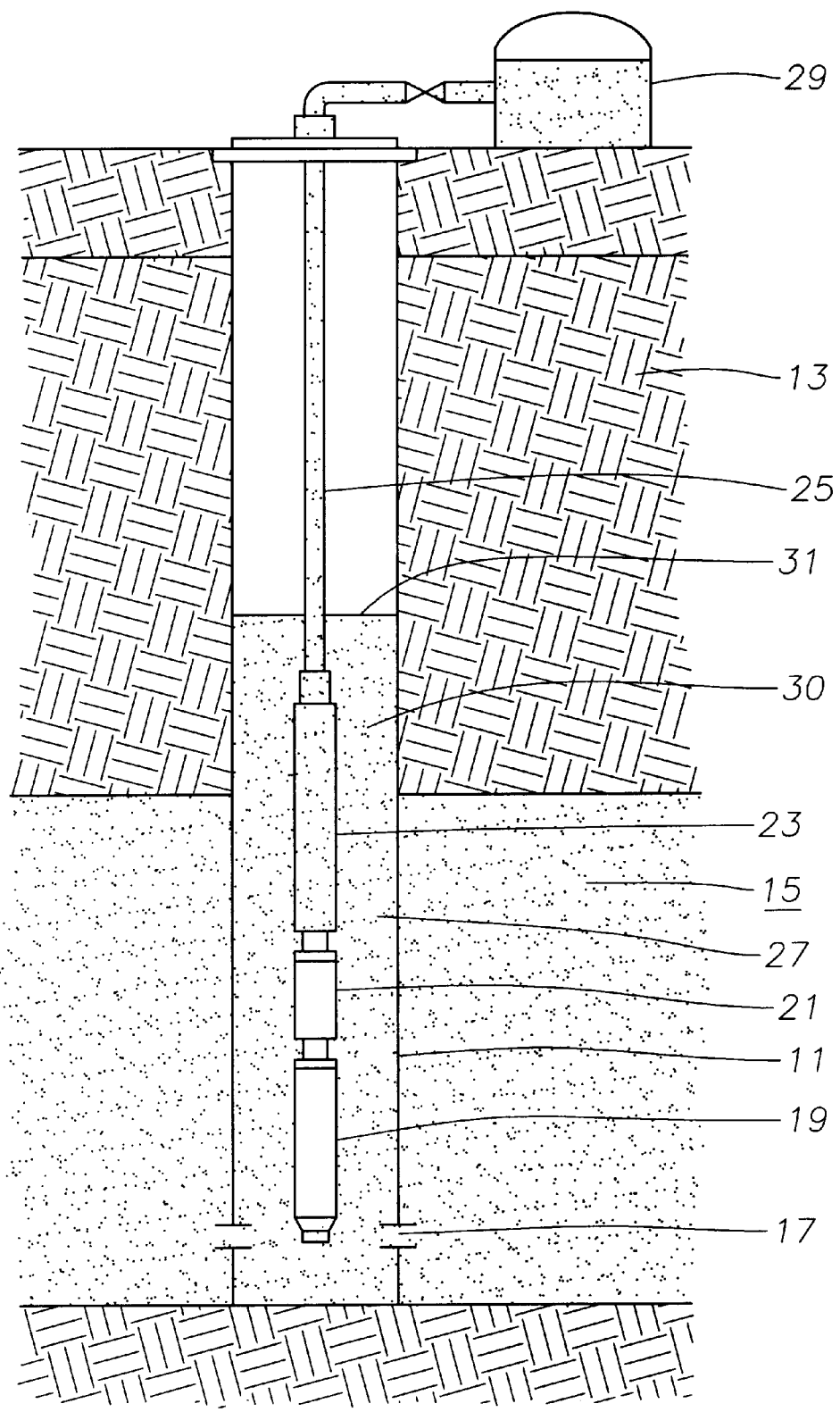
FIG. 1 is a side view of an electrical submersible pump assembly in a well.

Referring now to FIG. 1, well casing 11 is located within a well in earth formation 13 and also passes through a producing zone 15. Perforations 17 formed in the well casing 11 enable the fluid in the producing zone 15 to enter the casing 11.

The submersible pump assembly includes an electrical motor 19 that is located in the well. The shaft of motor 19 extends through a seal section 21 and is connected to a centrifugal pump 23. Pump 23 is connected to tubing 25 for conveying well fluid 27 to a storage tank 29 at the surface. The casing 11 will contain an of wellbore fluid 30 operating fluid level 31 in the annulus of the casing 11. The pump 23 must be capable of delivering fluid 30 for the distance from level 31 to the surface tank 29. Preferably, pump 23 is a centrifugal pump comprised of a plurality of pump stages 24 (FIG. 1a) within a housing 33.

Figures 1A, 2:
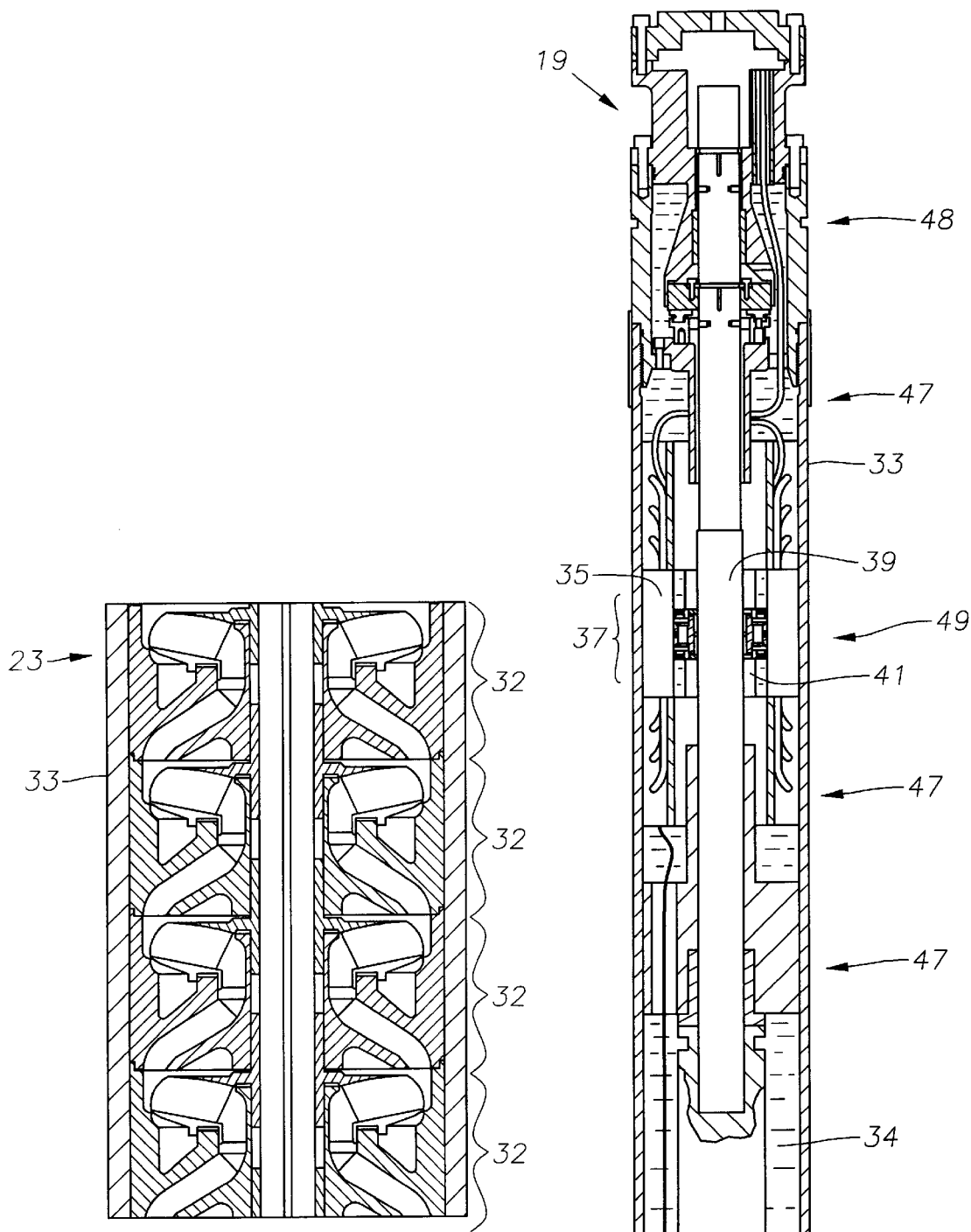
FIG. 1a is an enlarged cross-sectional view of a typical prior art multistage pump for use with the ESP of FIG. 1.
FIG. 2 is a cross-sectional view of a typical prior art downhole motor for use with the ESP of FIG. 1.
Figure 3:
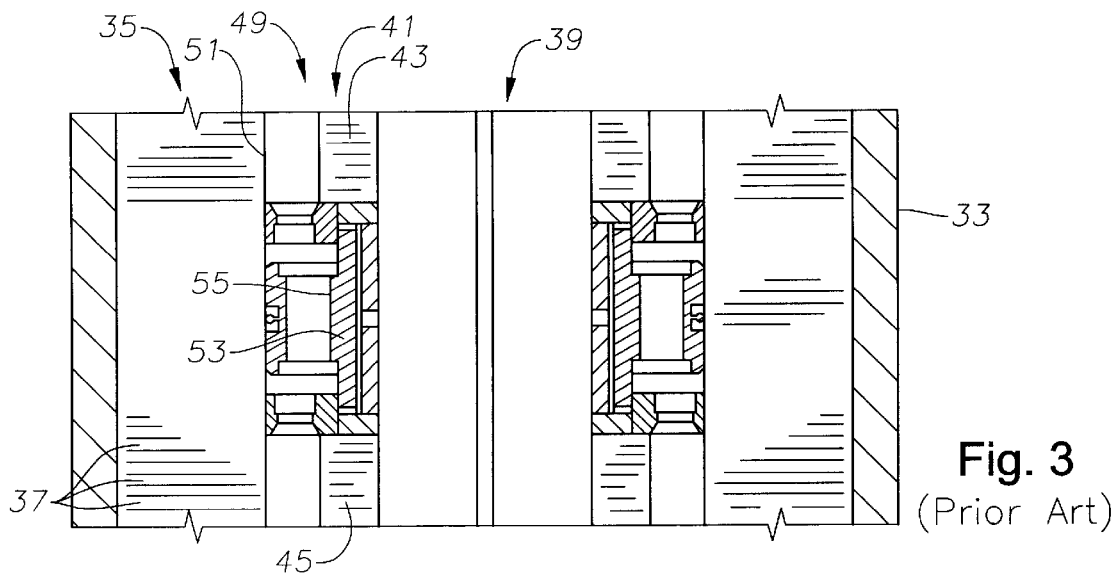
FIG. 3 is an enlarged view of one of the radial thrust bearings shown in the downhole motor of FIG. 1.

Referring now to FIGS. 2 and 3, a prior art submersible pump motor 19 is shown. Submersible pump motor 19 has a housing 33. Housing 33 is preferably filled with lubricant 34. A stator 35 having a plurality of magnetic laminations 37 is mounted within housing 33. A shaft 39 extends within stator 35 in motor 19. A rotor 41, having a plurality of spaced-apart rotor sections such as sections 43 and 45 (FIG. 3) are mounted on shaft 39. The shaft 39 is maintained concentrically within motor 19 by a plurality of bearings 47, 48, and 49 that are positioned at selected locations over a length of shaft 39. Bearings 47 comprise a bushing or sleeve pressed into a cylindrical bore in a structural member of motor 19. Bearing 48 is an axial thrust bearing. Bearing 49 is a typical motor bearing.

Figure 4:
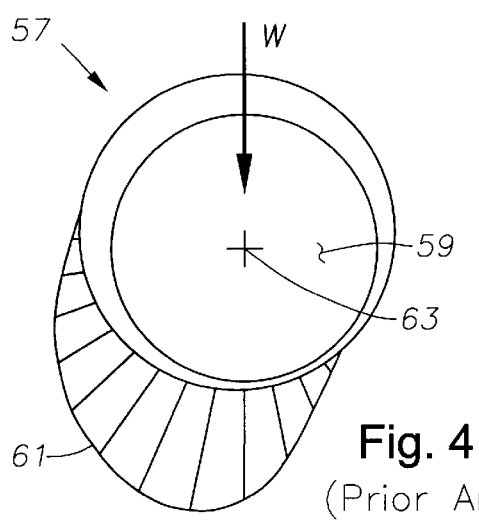
FIG. 4 is a schematic cross-sectional view of a plain sleeve bearing shown undergoing a vertical load transverse to a horizontal shaft.

Referring now to FIG. 3, a typical motor-bearing assembly 49 is shown. The motor-bearing assembly 49 has an outer diameter 51 and a sleeve 53 having an outer diameter 55. The motor bearing assembly surrounds shaft 39 and frictionally engages an inner surface of stator 35. The motor bearing assembly 49 is located between rotor section 43 and 45, which are mounted onto shaft 39. Referring now to FIG. 4, a plain sleeve bearing 57 is shown schematically with a shaft 59 oriented horizontally. Plain sleeve bearing 57 is shown in typical use experiencing a vertical load W perpendicular to shaft 59, which causes shaft 59 to operate in an off-center position with respect to sleeve bearing 57. The resultant of pressure distribution 61 from vertical load W acts through the center 63 of shaft 59 and directly opposes horizontal load W.

However, when used in submersible pump motors such as submersible pump motor 19 (FIGS. 1 and 2), plain sleeve bearing 57 is operated in a vertical position. Therefore, vertical load W perpendicular to shaft 59 does not exist. During vertical use, shaft 59 may be pushed off-center, which will result in a pressure distribution, such as illustrated as pressure distribution 61 in FIG. 4. Pressure distribution 61 does not act through center 63 of shaft 59, but is offset. The offset pressure results in the shaft being pushed off-center where the process repeats. The result is that shaft center 63 moves in a circular orbit. The size of the circular orbit depends on the speed of the shaft, as well as the viscosity of the lubricant within bearing 57.

Figure 5:
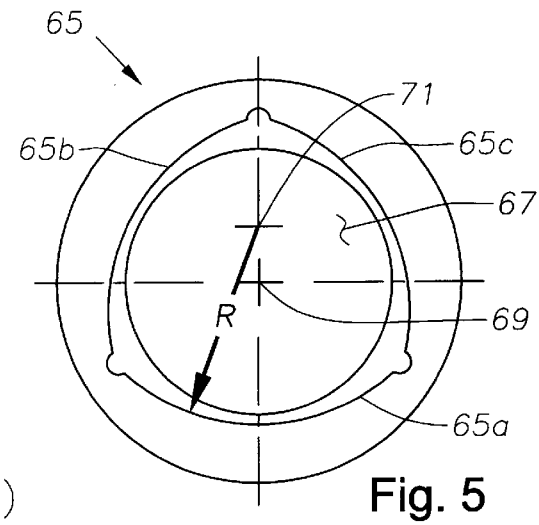
FIG. 5 is a cross-sectional view of a multi-lobed bearing for use with the motor of FIG. 1.
Figure 7:
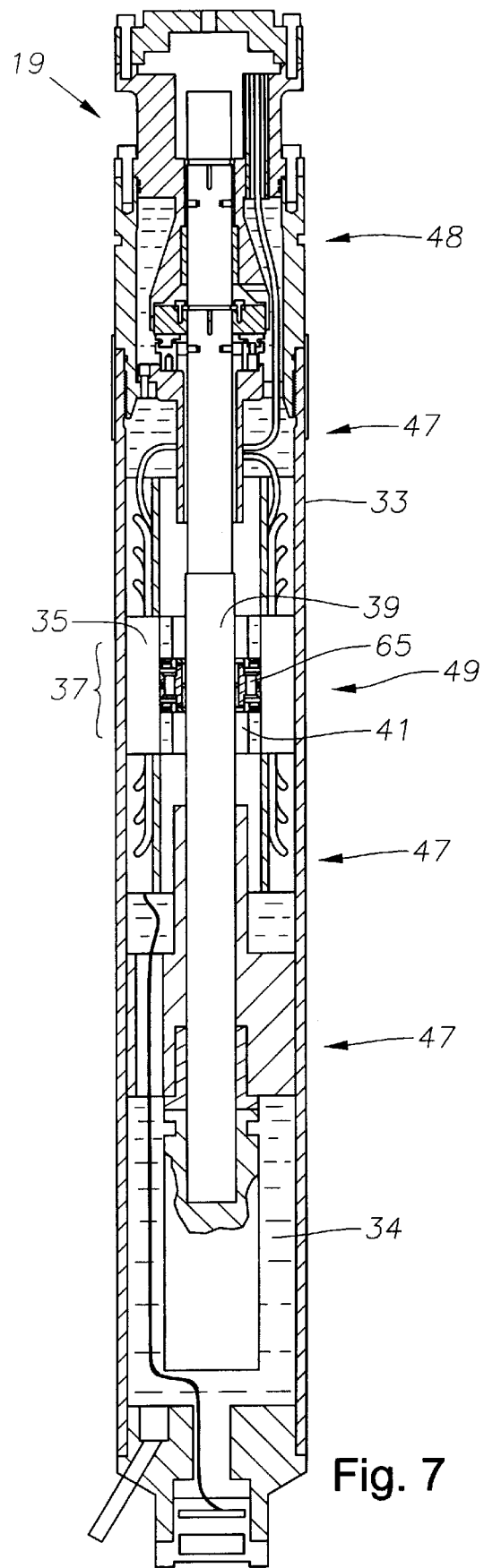
FIG. 7 is a cross-sectional view of a downhole motor for use with the ESP of FIG. 1, hating bearings constructed in accordance with the invention.

In the preferred embodiment as shown in FIG. 7, all of the motor-bearing assemblies 49 (FIGS. 2 and 3) utilize a multi-lobed bearing rather than plain sleeve bearings. Referring now to FIGS. 5 and 7, a preferred multi-lobed bearing is tri-lobed bearing 65, which may be used for bearings 47, 49 (FIG. 2). Tri-lobed bearing 65 is comprised of lobe 65a, lobe 65b, and lobe 65c. Lobes 65a, 65b and 65c are provided with identical curved arcuate surfaces, each with a radius R. The midpoint of each lobe 65a, 65b, 65c circumscribe a circle which closely receives shaft 67. The radius of shaft 67 is less than each radius R. Shaft 67 has a shaft center 69. The tri-lobed bearing 65 generates a pressure field on all three lobes, i.e., lobe 65a, lobe 65b and lobe 65c, because the center of each lobe about radius R is not the same as the shaft center 69. For example, it can be seen in FIG. 5 that lobe center 71 of lobe 65a is in a different location than shaft center 69. The result of the three pressure fields acting on the three lobes is a stable operation of the shaft within bearing 65.

Figure 6:
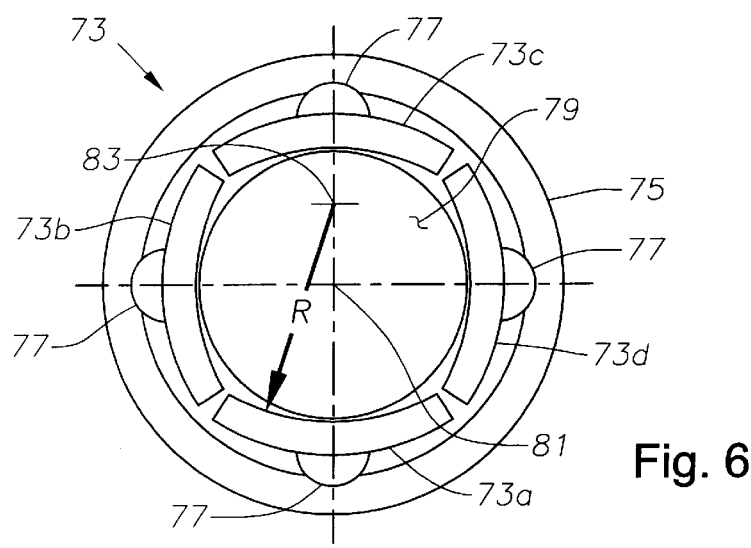
FIG. 6 is a cross-sectional view of a tilted pad bearing for use with the motor of FIG. 1.

Referring now to FIG. 6, shown is a tilting pad bearing 73 which may be used for bearings 47, 49 (FIG. 2). Tilting pad bearing 73 has four lobes. The four lobes of tilting pad bearing 73 are lobe 73a, lobe 73b, lobe 73c and lobe 73d. Each of the lobes is pivotally supported from an outer bearing housing 75 with members 77. Each lobe 73a–73d has a radius R, which is greater than a radius of a circle circumscribed by the lobes. A shaft 79 is located between lobes 73a, 73b, 73c and 73d and touches the lobes at their center points. Each of the lobes in the tilting pad bearing 73 generates a pressure field because the center of each lobe about radius R is not the center 81 of shaft 79. For example, it can be seen that the shaft center 81 is not the same as lobe center 83 of lobe 73a. Lobes 73a–73d are free to tilt or adjust about their respective members 77 to form pressure wedges.

In practice, plain sleeve bearings 57 (FIG. 4), which are traditionally used in a submersible pump motor such as submersible pump motor 19 (FIGS. 1 and 2) are replaced with multi-lobed bearings, such as tri-lobed bearing 65 (FIG. 5) or tilting pad bearing 73 (FIG. 6). When a multi-lobed bearing, such as tri-lobe bearing 65 or tilted pad bearing 73 is used, pressure forces are developed from each of the lobes. The pressure forces tend to stabilize the shaft within the bearing. The increased stability is due to the fact that the center of each of the lobes is not the same as the shaft center. The result is an increased stability of operation in a vertical unit utilizing the multi-lobed bearings.

The invention has several advantages. The reliability of submersible pumping motor units may be greatly increased by the use of dynamic stability bearings. By replacing the plain sleeve bearings within the motor with dynamically stable bearings such as multi-lobed bearings, vibration is reduced.

Although the invention has been shown in only one of its forms, it should be apparent to those skilled in the art that it is not so limited, but is susceptible to change without departing from the scope of the invention. For example, other accepted bearing types include a lemon bore bearing or a pocket bearing so long as the bearing is of a type having symmetrical bearing surfaces, which have a different radius than the shaft. Furthermore, although only the motor of an electrical submersible pump is shown, dynamically stable bearings may also be used in centrifugal pumps and seal sections of an electrical submersible pump assembly.

What is claimed is:

1. An electrical submersible pump assembly for use in a well, comprising in combination:
   an electrical motor having a lubricant-filled housing, a rotor and a stator;
   a centrifugal pump having a plurality of pump stages within a housing;
   a seal section connected between the pump and the motor for sealing well fluid from the motor and for reducing a pressure differential between the lubricant in the motor and the fluid in the wellbore;
   a shaft extending through the motor, seal section and pump for driving the pump; and
   a plurality of bearings in the motor, seal section and pump for stabilizing the shaft, at least one of the bearings in the motor being immersed in the lubricant in the motor and having bearing surfaces comprising a plurality of lobes mounted symmetrically about the shaft, each of the lobes being a curved surface that faces the shaft, and having center of curvature offset from a center of said shaft.

2. The submersible pump according to claim 1 wherein said at least one of bearings comprise three of the lobes.

3. The submersible pump according to claim 1 wherein said at least one of the bearings is a tilted pad bearing, wherein the lobes comprise independently pivotable pads.

4. The submersible pump motor according to claim 1 wherein said at least one of the bearings is positioned within the stator and rotor assembly, having an outer periphery engaging an inner diameter of the stator and an inner periphery supported by the shaft.

5. The submersible pump motor according to claim 1 wherein said at least one of the bearings are located in the seal section.

6. The submersible pump according to claim 1 wherein said lobes have a radius greater than a radius of the shaft.

7. An electrical submersible pump motor for use in a well, comprising:
   an electrical motor having a lubricant filled housing, a rotor and a stator, the stator having a plurality of magnetic laminations, each having a central opening defining an inner diameter for the stator;
   a shaft extending through the motor; and
   a plurality of bearing in the motor for radially stabilizing the shaft in the housing of the motor, at least one of the bearings being immersed in the lubricant between opposite ends of the stator, having an inner portion supported by the shaft and an outer portion frictionally engaging the inner diameter of the stator, said at lest one of the bearings having multiple lobes, each of the lobes mounted symmetrically about the shaft, having a radius greater than a radius of the shaft and having a center of curvature offset from a center of said shaft.

8. The submersible pump according to claim 7 wherein said at least one of the bearings is a tilted pad bearing, wherein the lobes comprise independently pivotable pads.

9. The submersible pump motor according to claim 7, wherein said plurality of bearing includes an upper bearing located above the stator and a lower bearing located below the stator, said upper and lower bearings being immersed in said lubricant within said housing, and wherein said upper and lower bearings have multiple lobes, each of the lobes of the upper and lower bearings having a radius greater than a radius of the shaft and having a center of curvature offset from a center of said shaft.

10. An electrical submersible pump assembly for use in a well, comprising in combination:

- an electrical motor having a lubricant-filled housing, a rotor and a stator, the stator having a plurality of magnetic laminations, each having an inner diameter;
- a centrifugal pump having a plurality of pump stages within a housing;
- a seal section connected between the pump and motor for sealing well fluid from the motor and for reducing a pressure differential between the lubricant in the motor and the fluid in the wellbore;
- a shaft extending through the motor, seal section and pump for driving the pump; and
- a plurality of bearing in the seal section and the pump for radially stabilizing the shaft;
- upper, intermediate and lower bearings being in the motor for radially stabilizing the shaft, each of the upper, intermediate and the lower bearing being immersed in the lubricant in the motor the intermediate bearing in the motor being located between upper and lower ends of the stator with an inner portion supported by the shaft and an outer portion frictionally engaging the inner diameters of some of the laminations, the upper, intermediate and lower bearing in the motor having bearing surfaces comprising a plurality of lobes mounted symmetrically about the shaft, each of the lobes being a curved surface that faces the shaft, having a radius greater than a radius of the shaft and having center of curvature offset from a center of said shaft.

11. The submersible pump assembly according to claim 10 wherein at least one of the bearing in the pump has bearing surfaces comprising a plurality of lobes mounted symmetrically about the shaft, each of the lobes of the said at least one of the bearings in the pump being a curved surface that faces the shaft, and has a center of curvature offset from a center of said shaft.

12. The submersible pump assembly according to claim 10 wherein the lobes of the upper, intermediate and lower bearings of the motor are independently pivotal pads.

* * * * *

UNITED STATES PATENT AND TRADEMARK OFFICE
CERTIFICATE OF CORRECTION

PATENT NO. : 6,099,271
DATED : August 8, 2000
INVENTOR(S) : Earl B. Brookbank

It is certified that error appears in the above-indentified patent and that said Letters Patent is hereby corrected as shown below:

Column 2, Line 18, please delete "Rest" and insert --Best--.

Column 2, Line 31, delete "of wellbore fluid 30".

Column 2, Line 32, after "operating fluid level 31", please insert --of wellbore fluid 30--.

Column 3, Line 20, delete "circumscribe" and insert --circumscribes--.

Column 4, Line 66, delete "bearing" and insert --bearings--.

Column 5, Line 20, delete "and".

UNITED STATES PATENT AND TRADEMARK OFFICE
CERTIFICATE OF CORRECTION

PATENT NO. : 6,099,271
DATED : August 8, 2000
INVENTOR(S) : Earl B. Brookbank

It is certified that error appears in the above-indentified patent and that said Letters Patent is hereby corrected as shown below:

Column 5, Line 22, after "shaft;", insert --and--.

Column 6, Line 1, delete "bearing" and insert --bearings--.

Column 6, Line 2, delete "motor" and insert --motors--.

Column 6, Line 7, delete "bearing" and insert --bearings--.

Column 6, Line 14, delete "bearing" and insert --bearings--.

Signed and Sealed this

Tenth Day of April, 2001

Attest:

NICHOLAS P. GODICI

*Attesting Officer*   Acting Director of the United States Patent and Trademark Office